(12) United States Patent
Li

(10) Patent No.: US 12,169,468 B2
(45) Date of Patent: Dec. 17, 2024

(54) INTER-INTEGRATED CIRCUIT SOUND (I2S) SERIAL BUS INTERFACE WITH SUPPORT FOR MULTIPLE SAMPLE RATES

(71) Applicant: Synaptics Incorporated, San Jose, CA (US)

(72) Inventor: Shi-Jie Li, Sichuan (CN)

(73) Assignee: Synaptics Incorporated, San Jose, CA (US)

( * ) Notice: Subject to any disclaimer, the term of this patent is extended or adjusted under 35 U.S.C. 154(b) by 0 days.

(21) Appl. No.: 18/051,991

(22) Filed: Nov. 2, 2022

(65) Prior Publication Data

US 2024/0143537 A1 May 2, 2024

(51) Int. Cl.
*G06F 13/42* (2006.01)
(52) U.S. Cl.
CPC .................. *G06F 13/4282* (2013.01)
(58) Field of Classification Search
CPC .................................................... G06F 13/4282
See application file for complete search history.

(56) References Cited

U.S. PATENT DOCUMENTS

| | | | | |
|---|---|---|---|---|
| 9,628,211 B1* | 4/2017 | Stoler | .................... | H04J 3/0658 |
| 9,787,313 B1* | 10/2017 | Klein | ..................... | H03K 5/135 |
| 2011/0199128 A1* | 8/2011 | Turner | .................. | G06F 1/0328 |
| | | | | 327/106 |
| 2011/0289129 A1* | 11/2011 | Wu | ......................... | H04L 7/027 |
| | | | | 708/311 |
| 2012/0001665 A1* | 1/2012 | Regimbal | .............. | H03K 23/68 |
| | | | | 327/115 |
| 2014/0143587 A1* | 5/2014 | Rajapakse | .......... | H04N 21/4305 |
| | | | | 713/600 |
| 2014/0341398 A1* | 11/2014 | Felder | ....................... | H03F 3/20 |
| | | | | 381/120 |
| 2015/0051669 A1* | 2/2015 | Bahmer | ................ | G09B 23/28 |
| | | | | 607/57 |
| 2015/0198966 A1* | 7/2015 | Lee | ......................... | G06F 1/324 |
| | | | | 713/501 |
| 2021/0173611 A1* | 6/2021 | Chen | ........................ | G06F 1/04 |

* cited by examiner

*Primary Examiner* — Henry Tsai
*Assistant Examiner* — Harry Z Wang
(74) *Attorney, Agent, or Firm* — Paradice & Li LLP

(57) ABSTRACT

This disclosure provides methods, devices, and systems for audio communications. The present implementations more specifically relate to transmitting and receiving audio data at sample rates that are non-integer multiples of a clock frequency. In some aspects, a serial bus interface may generate a word select (WS) signal based on an input clock signal and may dynamically adjust a periodicity of the WS signal so that the WS signal has an effective frequency equal to a non-integer multiple of the clock frequency. In some implementations, the WS signal may be produced by direct digital synthesis (DDS) of the clock signal using a frequency control word (FCW). In such implementations, the periodicity of the WS signal may be dynamically adjusted by biasing the FCW based on errors or differences between the frequency of the WS signal and the desired frequency (such as in a feedback loop).

18 Claims, 9 Drawing Sheets

INTER-INTEGRATED CIRCUIT SOUND (I2S) SERIAL BUS INTERFACE WITH SUPPORT FOR MULTIPLE SAMPLE RATES

TECHNICAL FIELD

The present implementations relate generally to serial bus interfaces, and specifically to inter-integrated circuit sound (I2S) serial bus interfaces with support for multiple sample rates.

BACKGROUND OF RELATED ART

Serial buses are generally used to communicate serialized data streams between integrated circuit (IC) devices or components. Some serial buses may support the transmission of a data signal concurrently with a clock signal from a transmitting device to a receiving device. Such communications are also referred to as "synchronous" communications. The receiving device samples the data signal, in response to rising or falling edges of the clock signal, to recover the serialized data. In other words, the clock signal indicates a timing or alignment of the serialized data with respect to the time-varying data signal.

The inter-IC sound (I2S) serial bus standard defines a set of protocols for communicating audio data between IC devices. An I2S serial bus interface supports the transmission of a word select (WS) signal together with a data signal and a clock signal (also referred to as a "bit clock" or a "serial clock"). The WS signal is a periodic signal that delineates individual frames (also referred to as "samples") of audio data. For example, each audio frame includes data associated with a left audio channel and data associated with a right audio channel. For a given audio frame, the data associated with the right audio channel is aligned with (or follows) a rising edge of the WS signal and the data associated with the left audio channel is aligned with (or follows) a falling edge of the WS signal. In other words, each period of the WS signal spans a respective frame or sample of audio data. As such, the sample rate of audio data depends on the frequency of the WS signal.

Some audio communication systems may support multiple sample rates. For example, an audio IC device may be configured to play back audio content at a first sample rate and record audio content at a second sample rate (that is often higher than the first sample rate). Some I2S serial bus interfaces can support bidirectional communications based on a single input clock signal. However, to transmit and receive audio data at different sample rates, the I2S serial bus interface must output WS signals having different frequencies. Thus, it may be desirable to generate WS signals with different frequencies using the same input clock signal.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

One innovative aspect of the subject matter of this disclosure can be implemented in a method of communicating audio data by a serial bus interface. The method includes steps of outputting a first word select (WS) signal that transitions between a low logic state and a high logic state based on a clock signal having a first frequency of oscillation so that each transition of the first WS signal is aligned with a respective edge of the clock signal; dynamically adjusting a periodicity of the first WS signal so that the first WS signal oscillates between the low logic state and the high logic state at a desired frequency over a threshold duration, the first frequency being a non-integer multiple of the desired frequency; and outputting, over the threshold duration, a series of data frames associated with the first WS signal.

Another innovative aspect of the subject matter of this disclosure can be implemented in a serial bus interface. The serial bus interface includes a word select (WS) synthesizer configured to output a first WS signal that transitions between a low logic state and a high logic state based on a clock signal having a first frequency of oscillation so that each transition of the first WS signal is aligned with a respective edge of the clock signal; frequency adjustment circuitry configured to dynamically adjust a periodicity of the first WS signal so that the first WS signal oscillates between the low logic state and the high logic state at a desired frequency over a threshold duration, the first frequency being a non-integer multiple of the desired frequency; and a data buffer configured to output, over the threshold duration, a series of data frames associated with the first WS signal.

Another innovative aspect of the subject matter of this disclosure can be implemented in a method of communicating audio data by a serial bus interface. The method includes steps of outputting a first (WS) signal that transitions between a low logic state and a high logic state based on a clock signal having a first frequency of oscillation so that each transition of the first WS signal is aligned with a respective edge of the clock signal; dynamically adjusting a periodicity of the first WS signal so that the first WS signal oscillates between the low logic state and the high logic state at a desired frequency over a threshold duration, the first frequency being a non-integer multiple of the desired frequency; and receiving, over the threshold duration, a series of data frames associated with the first WS signal.

BRIEF DESCRIPTION OF THE DRAWINGS

The present implementations are illustrated by way of example and are not intended to be limited by the figures of the accompanying drawings.

DETAILED DESCRIPTION

Figure 1:
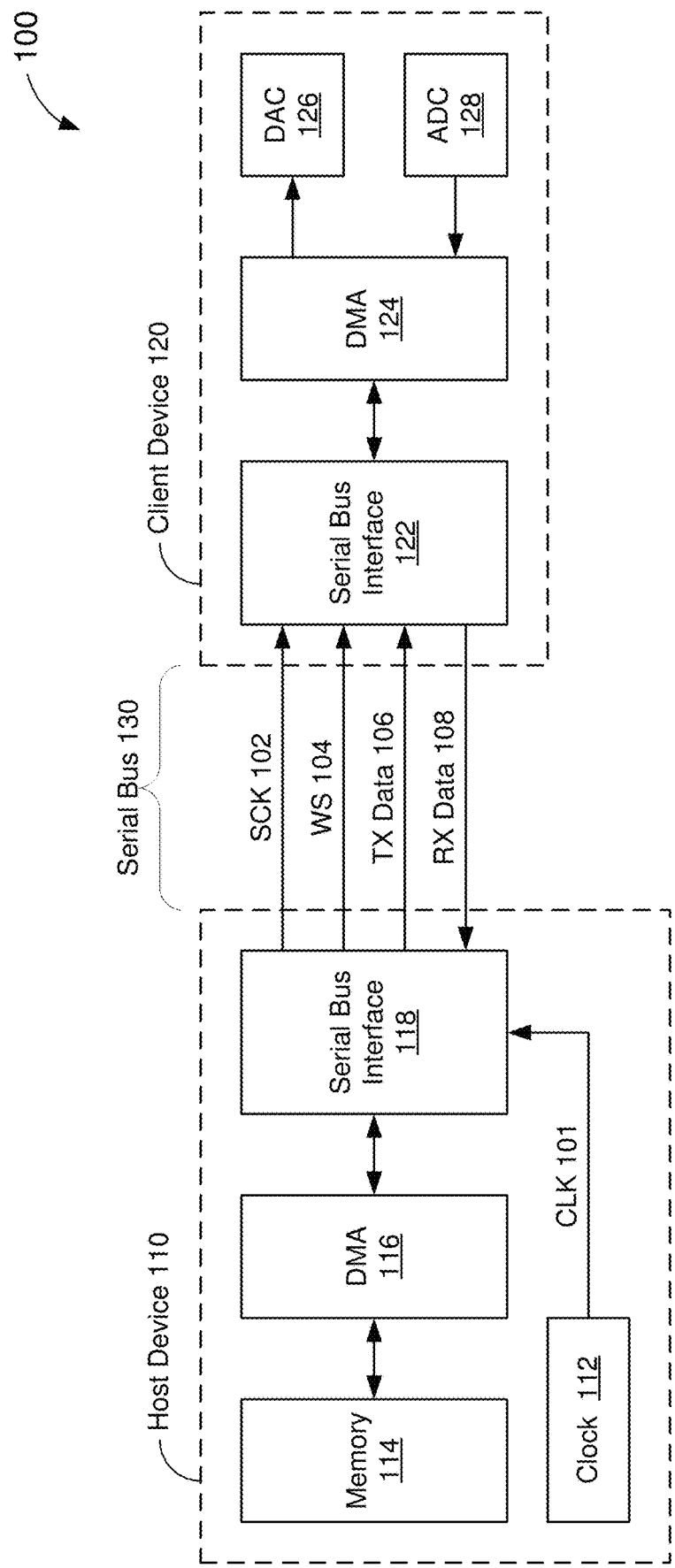
FIG. 1 shows an example communication system that supports bidirectional audio communications.

In the following description, numerous specific details are set forth such as examples of specific components, circuits, and processes to provide a thorough understanding of the present disclosure. The term "coupled" as used herein means connected directly to or connected through one or more intervening components or circuits. The terms "electronic system" and "electronic device" may be used interchangeably to refer to any system capable of electronically processing information. Also, in the following description and for purposes of explanation, specific nomenclature is set forth to provide a thorough understanding of the aspects of the disclosure. However, it will be apparent to one skilled in the art that these specific details may not be required to practice the example embodiments. In other instances, well-known circuits and devices are shown in block diagram form to avoid obscuring the present disclosure. Some portions of the detailed descriptions which follow are presented in terms of procedures, logic blocks, processing and other symbolic representations of operations on data bits within a computer memory.

These descriptions and representations are the means used by those skilled in the data processing arts to most effectively convey the substance of their work to others skilled in the art. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system. It should be borne in mind, however, that all of these and similar terms are to be associated with the appropriate physical quantities and are merely convenient labels applied to these quantities.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example input devices may include components other than those shown, including well-known components such as a processor, memory and the like.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium including instructions that, when executed, performs one or more of the methods described above. The non-transitory processor-readable data storage medium may form part of a computer program product, which may include packaging materials.

The non-transitory processor-readable storage medium may comprise random access memory (RAM) such as synchronous dynamic random-access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors (or a processing system). The term "processor," as used herein may refer to any general-purpose processor, special-purpose processor, conventional processor, controller, microcontroller, and/or state machine capable of executing scripts or instructions of one or more software programs stored in memory.

As described above, the inter-IC sound (I2S) serial bus standard defines a set of protocols for communicating audio data between IC devices. An I2S serial bus interface supports the transmission of a word select (WS) signal together with a data signal and a clock signal (also referred to as a "bit clock" or a "serial clock"). The WS signal is a periodic signal that delineates individual frames (also referred to as "samples") of audio data. For example, each audio frame includes data associated with a left audio channel and data associated with a right audio channel. For a given audio frame, the data associated with the right audio channel is aligned with (or follows) a rising edge of the WS signal and the data associated with the left audio channel is aligned with (or follows) a falling edge of the WS signal. In other words, each period of the WS signal spans a respective frame or sample of audio data. As such, the sample rate of audio data depends on the frequency of the WS signal.

Some communication systems may support multiple sample rates. For example, audio data is often played back at a sample rate equal to 44.1 kHz and recorded at a sample rate equal to 48 kHz. As such, a host device may need to transmit 44,100 frames of audio data for each second of audio to be played back by a client device and may need to receive 48,000 frames of audio data for each second of audio recorded by the client device. To support the different sample rates, the host device must produce a 44.1 kHz WS signal and a 48 kHz WS signal. Many existing I2S serial bus interfaces are configured to produce WS signals from an input clock signal through frequency division. For example, a 44.1 kHz WS signal can be derived from a 44.1*N kHz clock signal and a 48 kHz WS signal can be derived from a 48*M kHz clock signal (where N and M are integer values). As a result, the frequency of the clock signal (also referred to as the "clock frequency") is often an integer multiple of the frequency of the WS signal.

Existing I2S serial bus interfaces are designed to receive only one input clock signal. A 44.1 kHz WS signal and a 48 kHz WS signal can both be derived from a 21.168 MHz clock signal. However, such a high-frequency bit clock may produce undesirably long audio frames (resulting in many unused bits in each frame of audio data). Aspects of the present disclosure recognize that in order to use a lower frequency clock signal (such as below 21.168 MHz) to derive both a 44.1 kHz WS signal and a 48 kHz WS signal, at least one of the WS signals must be a non-integer multiple of the clock frequency.

Various aspects relate generally to serial bus interfaces for audio communications, and more particularly, to transmitting and receiving audio data at sample rates that are non-integer multiples of a clock frequency. In some aspects, a serial bus interface may generate a WS signal based on an input clock signal and may dynamically adjust a periodicity of the WS signal so that the WS signal has an effective frequency equal to a non-integer multiple of the clock frequency. For example, the period of the WS signal may change or oscillate so that the average frequency of the WS signal is equal to a desired frequency (representing the effective frequency of the WS signal). In some implementations, the WS signal may be produced by direct digital synthesis (DDS) of the clock signal using a frequency control word (FCW). For example, the FCW can be used to tune the frequency of the WS signal to be relatively close to the desired frequency. In such implementations, the periodicity of the WS signal may be dynamically adjusted by biasing the FCW based on errors or differences between the frequency of the WS signal and the desired frequency (such as in a feedback loop).

Particular implementations of the subject matter described in this disclosure can be implemented to realize one or more of the following potential advantages. By dynamically adjusting the periodicity of a WS signal, aspects of the present disclosure may support audio communications at sample rates that are non-integer multiples of a clock frequency. For example, a 44.1 kHz WS signal can be generated from a 6.144 MHz clock signal. Accordingly, serial bus interfaces of the present implementations can support audio communications at multiple sample rates, where at least one of the sample rates is not an integer multiple of any of the other sample rates. For example, using a single 6.144 MHz clock signal, a host device can transmit audio playback data to a client device at a sample rate equal to 44.1 kHz and receive audio recording data from the client device at a sample rate equal to 48 kHz (via the same serial bus interface). More specifically, the host device may generate a 48 kHz WS signal through frequency division $$\left(48 \text{ kHz} = \frac{6.144 \text{ MHz}}{128}\right)$$

and may generate a 44.1 kHz WS signal through frequency synthesis and a feedback loop that dynamically adjusts the periodicity of the WS signal to regulate its effective frequency.

FIG. 1 shows an example communication system 100 that supports bidirectional audio communications. The communication system 100 includes a host device 110 and a client device 120. The client device 120 may be any device capable of playing back and recording audio signals. The host device 110 may be any device capable of transmitting (TX) audio data 106 to, and receiving (RX) audio data from, the client device 120. For example, the TX audio data 106 may represent audio signals to be played back by the client device 120 and the RX audio data 106 may represent audio signals recorded by the client device 120. In some aspects, the TX audio data 106 and the RX audio data 108 may be communicated over a serial bus 130.

The host device 110 includes a clock generator 112, a memory 114, a direct memory access (DMA) controller 116, and a serial bus interface 118. The memory may store the TX audio data 106 to be transmitted to the client device 120 and the RX audio data 108 received from the client device 120. The DMA controller 116 transfers the TX audio data 106 and the RX audio data 108 between the memory 114 and the serial bus interface 118. The serial bus interface 118 may output the TX audio data 106 onto the serial bus 130 and receive the RX audio data 108 on the serial bus 130 based, at least in part, on a clock (CLK) signal 101 provided by the clock generator 112. For example, the serial bus interface 118 may output each bit of TX audio data 106 responsive to a rising (or falling) edge of the CLK signal 101 and may sample each bit of RX audio data 108 responsive to a rising (or falling) edge of the CLK signal 101. In some implementations, the serial bus interface 118 may further output the CLK signal 101, as a serial clock (SCK) signal 102, onto the serial bus 130 for timing synchronization with the client device 120.

The client device 120 includes a serial bus interface 122, a DMA controller 124, a digital-to-analog converter (DAC) 126, and an analog-to-digital converter (ADC) 128. The serial bus interface 122 may receive the TX audio data 106 on the serial bus 130 and output the RX audio data 108 onto the serial bus 130 based, at least in part, on the SCK signal 102. For example, the serial bus interface 122 may sample each bit of the TX audio data 106 responsive to a rising (or falling) edge of the SCK signal 102 and may output each bit of the RX audio data 108 responsive to a rising (or falling) edge of the SCK signal 102. The DMA controller 124 transfers the TX audio data 106 from the serial bus interface 122 to the DAC 126 and transfers the RX audio data 108 from the ADC 128 to the serial bus interface 122. The DAC 126 may convert the TX audio data 106 to an analog audio signal that can be output by a speaker (not shown for simplicity). The ADC 128 may convert an analog audio signal received from a microphone (not shown for simplicity) to the RX audio data 108.

In some aspects, the serial bus interfaces 118 and 122 may conform to the inter-IC (I2S) serial bus standard. For example, the serial bus interface 118 may operate as the I2S controller (or "master") and the serial bus interface 122 may operate as an I2S target (or "slave"). As such, the serial bus interface 118 may further provide a word select (WS) signal 104 on the serial bus 130. The WS signal 104 is a periodic signal that delineates frames (also referred to as "samples") of audio data. More specifically, each period of the WS signal 104 spans a respective frame of audio data. For example, each audio frame may include data associated with a left audio channel and data associated with a right audio channel. The data associated with the right audio channel is aligned with (or follows) rising edges of the WS signal 104 and the data associated with the left audio channel is aligned with (or follows) falling edges of the WS signal 104. Thus, the frequency of the WS signal 104 controls the rate at which audio frames are communicated on the serial bus 130.

Figure 2A:
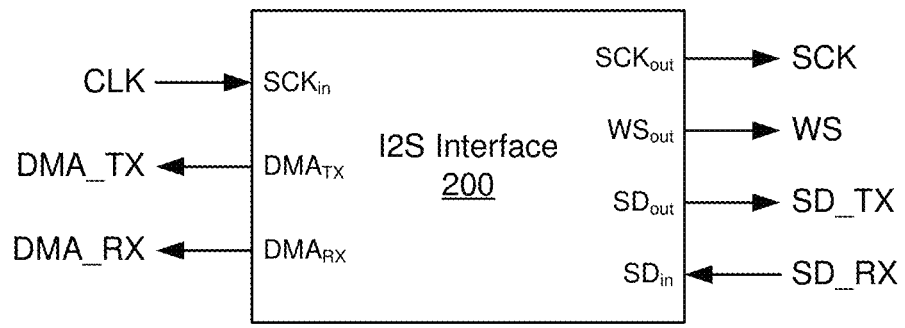
FIG. 2A shows an example inter-integrated circuit sound (I2S) serial bus interface.

FIG. 2A shows an example I2S serial bus interface 200. In some implementations, the I2S interface 200 may be one example of the serial bus interface 118 of FIG. 1. In the example of FIG. 2A, the I2S interface 200 is shown to include a DMA output ($DMA_{TX}$) to output DMA requests associated with a TX direction (DMA_TX) and a DMA output ($DMA_{RX}$) to output DMA requests associated with an RX direction (DMA_RX). With reference for example to FIG. 1, the DMA requests DMA_TX and DMA_RX may be provided to the DMA 116 to transfer TX audio data 106 and RX audio data 108, respectively, to and from the memory 114.

The I2S interface 200 further includes a serial clock input ($SCK_{in}$) to receive an input clock (CLK) signal, a serial clock output ($SCK_{out}$) to output a serial clock (SCK) signal, a WS output ($WS_{out}$) to output a WS signal, a serial data output ($SD_{out}$) to output serial data signal in a TX direction, and a serial data input ($SD_{in}$) to receive a serial data in an RX direction. With reference for example to FIG. 1, the CLK, SCK, WS, SD_TX, and SD_RX signals may be examples of the CLK signal 101, the SCK signal 102, the WS signal 104, the TX audio data 106, and the RX audio data 108, respectively.

Figure 2B:
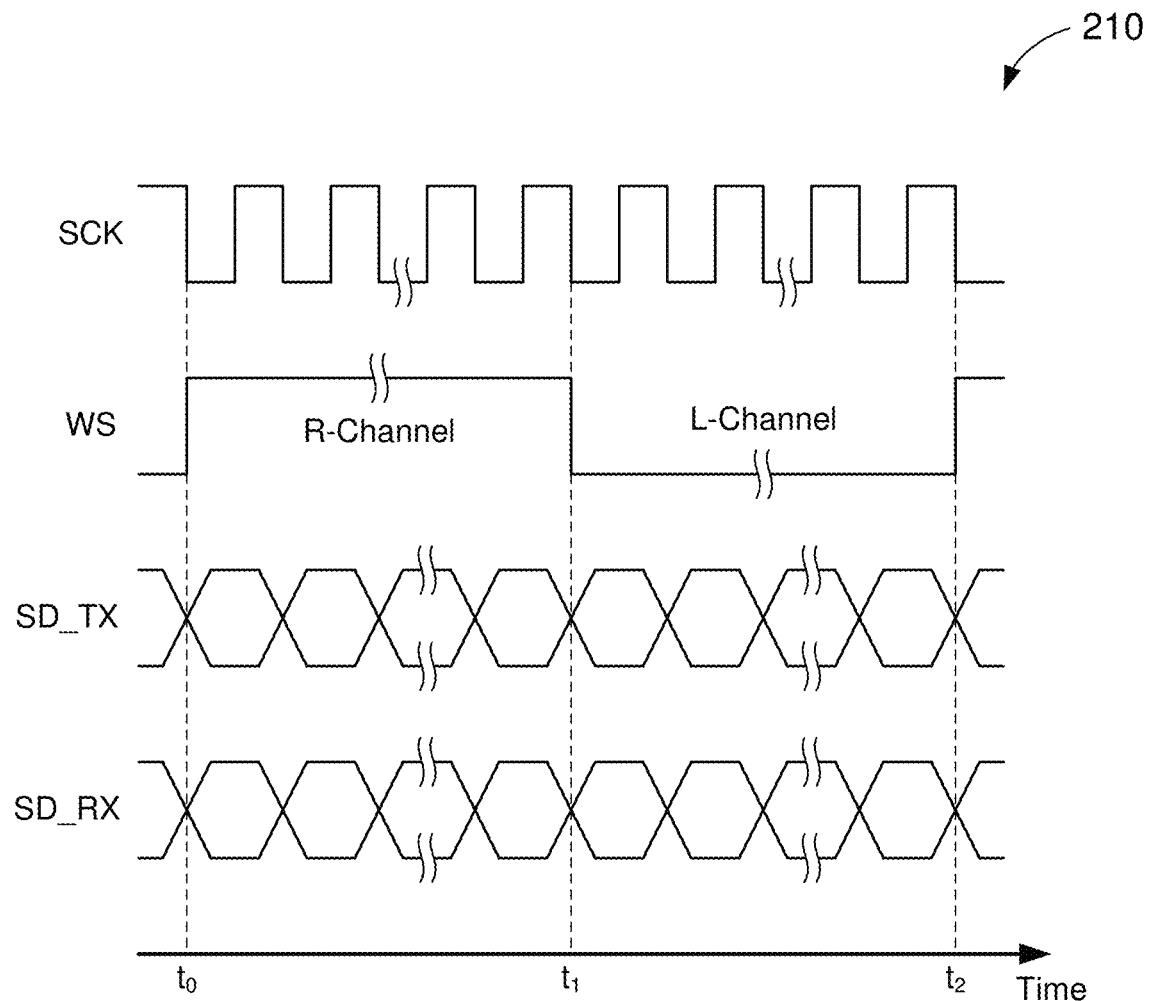
FIG. 2B shows a timing diagram depicting an example operation of the I2S serial bus interface of FIG. 2A.

FIG. 2B shows a timing diagram 210 depicting an example operation of the I2S serial bus interface 200 of FIG. 2A. The I2S interface 200 outputs the SCK signal, the WS signal, and the SD_TX signal onto an I2S serial bus (such as the serial bus 130 of FIG. 1), from times $t_0$ to $t_2$, and also receives the SD_RX signal on the I2S serial bus. In the example of FIG. 2B, each data sample (or bit) of the SD_TX signal is aligned with a respective rising-edge transition of the SCK signal (such as when SCK transitions from a low logic state to a high logic state) and each data sample of the SD_RX signal is also aligned with a respective rising-edge transition of the SCK signal.

In some implementations, audio data may be transmitted in "words" alternating between left and right audio channels. More specifically, each successive word of audio data is associated with a different (left or right) audio channel, and a different word of audio data is transmitted every sample interval. The WS signal indicates whether the audio data signaled on the I2S interface is associated with a right audio channel (R-Channel) or a left audio channel (L-Channel). In the example of FIG. 2B, the WS signal indicates the right audio channel when asserted to a high logic state (such as between times $t_0$ and $t_1$) and indicates the left audio channel when asserted to a low logic state (such as between times $t_1$ and $t_2$). Accordingly, the WS signal may periodically oscillate or transition between the logic-high state (L-Channel) and the logic-low state (R-Channel) to support the transmission of a series of audio frames.

As shown in FIG. 2B, samples of the SD_TX signal and the SD_RX signal carried on the I2S serial bus between times $t_0$ and $t_1$ are aligned with a logic-high state of the WS signal and are thus associated with the right audio channel. In some implementations, the I2S interface 200 may store such samples of the SD_TX signal in a portion of a TX data buffer allocated for the right audio channel and may store such samples of the SD_RX signal in a portion of an RX data buffer allocated for the right audio channel. By contrast, samples of the SD_TX signal and the SD_RX signal carried on the I2S serial bus between times $t_1$ and $t_2$ are aligned with a logic-low state of the WS signal and are thus associated with the left audio channel. In some implementations, the I2S interface 200 may store such samples of the SD_TX signal in a portion of the TX data buffer allocated for the left audio channel and may store such samples of the SD_RX signal in a portion of the RX data buffer allocated for the left audio channel.

In the example of FIG. 2B, the SD_TX signal and the SD_RX signal are synchronized to the same WS signal. As such, the SD_TX signal must have the same frame rate as the SD_RX signal. In other words, the SD_TX signal and the SD_RX signal must carry the same number of frames of TX audio data per second. However, aspects of the present disclosure recognize that audio signals are often played back and recorded at different sample rates. More specifically, audio signals may be played back at a sample rate equal to 44.1 kHz whereas audio signals may be recorded at a sample rate equal to 48 kHz. With reference for example to FIG. 1, the host device 110 may transmit 44,100 frames of TX audio data 106 per second to the client device 120 and may receive 48,000 frames of RX audio data 108 per second from the client device 120. To support the transmission and reception of audio frames at different sample rates, the serial bus interface 118 may need to produce a first WS signal having a frequency equal to the sample rate associated with the TX audio data 106 and a second WS signal having a frequency equal to the sample rate associated with the RX audio data 108.

Figure 3:
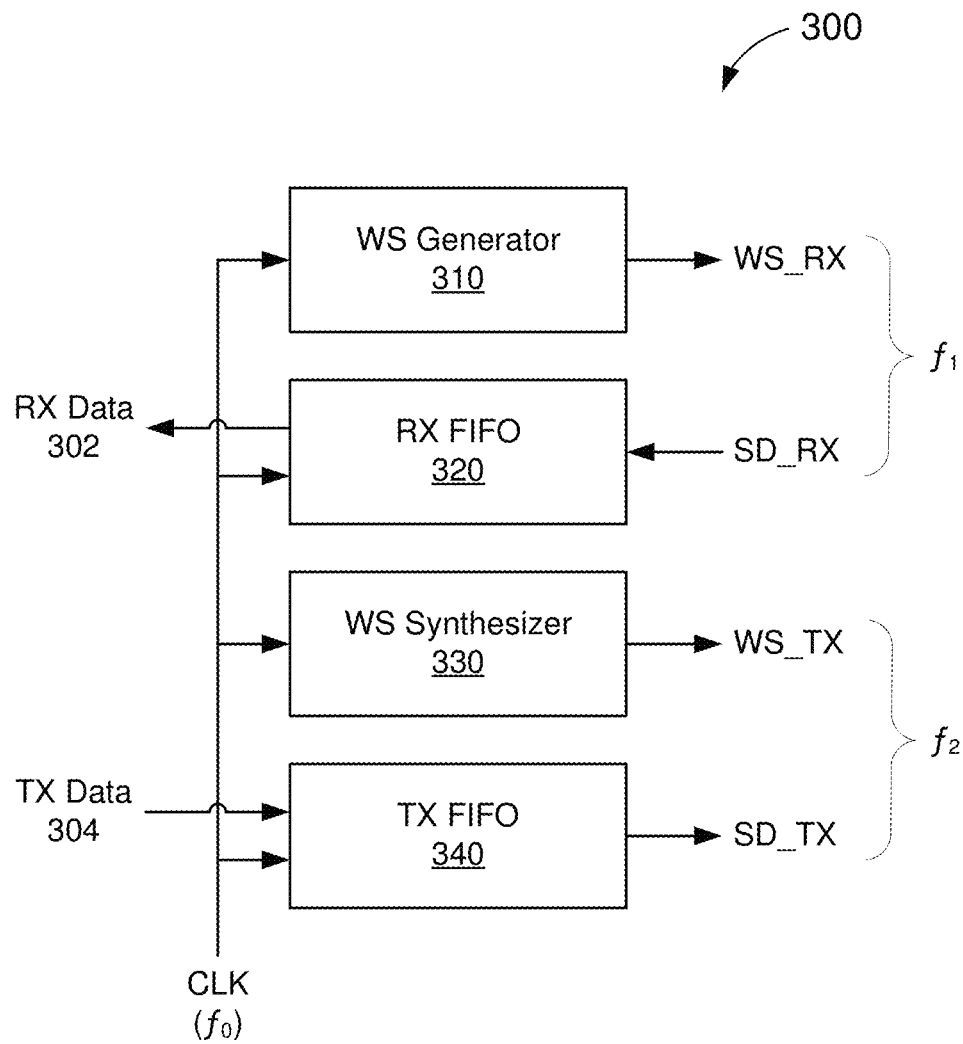
FIG. 3 shows a block diagram of an example serial bus interface that supports audio communications at multiple data rates, according to some implementations.

FIG. 3 shows a block diagram of an example serial bus interface 300 that supports audio communications at multiple data rates, according to some implementations. In some implementations, the serial bus interface 300 may be one example of the serial bus interface 118 of FIG. 1. In some aspects, the serial bus interface 300 may be configured to receive frames of RX data 302 and output frames of TX data 304, on a serial bus (such as the serial bus 130 of FIG. 1), at different sample rates.

The serial bus interface 300 includes a WS generator 310, an RX first-in first-out (FIFO) data buffer 320, a WS synthesizer 330, and a TX FIFO data buffer 340. The WS generator 310 is configured to generate a word select (WS_RX) signal based on a clock (CLK) signal having a predetermined frequency $f_0$. In some aspects, the WS generator 310 may produce the WS_RX signal through frequency division so that the frequency $f_1$ (also referred to as the "RX frequency") of the WS_RX signal is a fraction of the clock frequency $f_0$. For example, the WS generator 310 may divide the clock frequency $f_0$ by an integer value (N) to produce the RX frequency $f_1=f_0/N$. In some implementations, the clock frequency $f_0$ may be equal to 6.144 MHz and the RX frequency $f_1$ may be equal to 48 kHz (where N=128).

The RX FIFO 320 is configured to sample the SD_RX signal, as RX data 302, based on the CLK signal and the WS_RX signal. As described with reference to FIG. 2B, the RX FIFO 320 may receive a word of RX data 302 associated with the right audio channel when the WS_RX signal is asserted to a high logic state and may receive a word of RX data 302 associated with the left audio channel when the WS_RX signal is asserted to a low logic state. More specifically, each bit of the RX data 302 may be sampled in response to a rising (or falling) edge of the CLK signal. Accordingly, the frequency $f_1$ of the WS_RX signal controls the rate at which frames of RX data 302 are received by the RX FIFO 320. For example, if the RX frequency $f_1$ is equal to 48 kHz, the RX FIFO 320 may receive 48,000 frames of RX data 302 each second.

The WS synthesizer 330 is configured to generate another word select (WS_TX) signal based on the CLK signal. In some aspects, the WS synthesizer 330 may produce the WS_TX signal through frequency synthesis so that the frequency of the WS_TX signal is within a threshold range of a desired frequency $f_2$ (also referred to as the "TX frequency"). In some implementations, the clock frequency $f_0$ may be a non-integer multiple of the TX frequency $f_2$. As such, the frequency of the WS_TX signal (achieved through frequency synthesis) may not be exactly equal to the TX frequency $f_2$. In some implementations, the WS synthesizer 330 may dynamically adjust the periodicity of the WS_TX signal so that the effective frequency of the WS_TX signal is substantially equal to the TX frequency $f_2$ over any given duration of time. In some implementations, the TX frequency $f_2$ may be equal to 44.1 kHz.

The TX FIFO 340 is configured to output the SD_TX signal, as TX data 304, based on the CLK signal and the WS_TX signal. As described with reference to FIG. 2B, the TX FIFO 340 may transmit a word of TX data 304 associated with the right audio channel when the WS_TX signal is asserted to a high logic state and may transmit a word of TX data 304 associated with the left audio channel when the WS_TX signal is asserted to a low logic state. More specifically, each bit of the TX data 304 may be output in response to a rising (or falling) edge of the CLK signal. Accordingly, the frequency of the WS_TX signal controls the rate at which frames of TX data 304 are transmitted by the TX FIFO 340. For example, if the TX frequency $f_2$ is equal to 44.1 kHz, the WS_TX signal may cycle through 44,100 periods over the duration of a second so that the TX FIFO 340 transmits 44,100 frames of TX data 304 each second.

Figure 4:
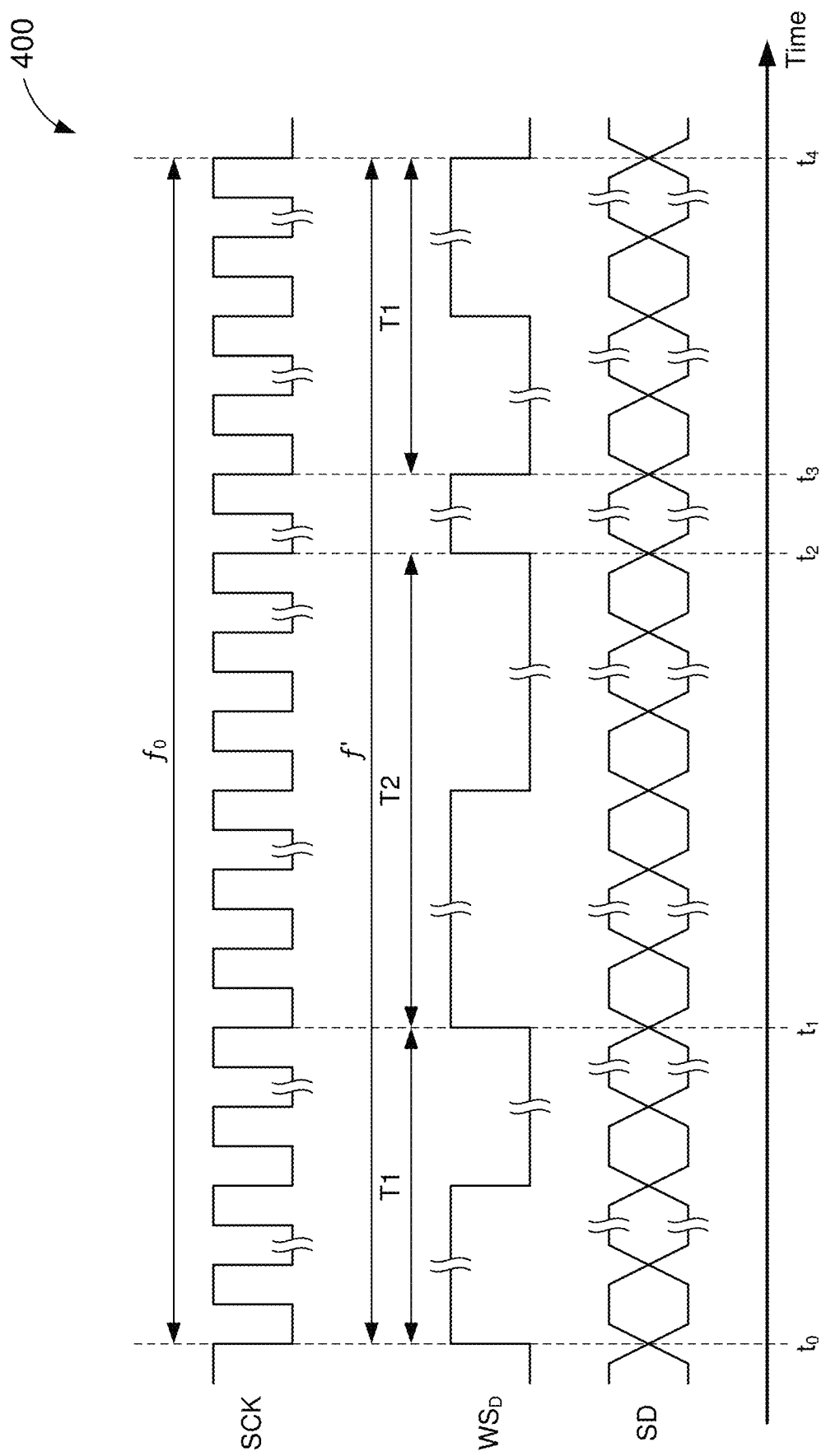
FIG. 4 shows a timing diagram depicting an example transmission of audio data in accordance with a dynamic word select word select signal.

FIG. 4 shows a timing diagram 400 depicting an example transmission of audio data associated with a dynamic word select ($WS_D$) signal. As used herein, the term "dynamic" WS signal refers to a WS signal having a periodicity that varies over time. In some implementations, the $WS_D$ signal may be produced by a WS synthesizer (such as the WS synthesizer 330 of FIG. 3). With reference for example to FIG. 3, the $WS_D$ signal may be one example of the WS_TX signal.

The $WS_D$ signal is output onto a serial data bus (such as an I2S serial bus) along with a serial clock (SCK) signal and a serial data (SD) signal between times $t_0$ and $t_4$. In some aspects, the SCK and $WS_D$ signals may be provided by an I2S controller (such as any of the serial bus interfaces 118 or 300 of FIGS. 1 and 3, respectively). In some implementations, the SD signal may be transmitted in a TX direction by the I2S controller. In some other implementations, the SD signal may be transmitted in an RX direction by an I2S target (such as the serial bus interface 122 of FIG. 1).

The SCK signal has a fixed clock frequency $f_0$ whereas the $WS_D$ signal has varying periodicity. For example, the $WS_D$ signal has a first signal period (T1) between times $t_0$ and $t_1$ and a second signal period (T2) between times $t_2$ and $t_3$. In the example of FIG. 4 the second signal period T2 is longer than the first signal period T1. In some implementations, the periodicity of the $WS_D$ signal may oscillate between two or more signal periods so that the effective frequency f' of the $WS_D$ signal is equal to a desired frequency ($f_S$) over a given duration of time. For example, the periodicity of the $WS_D$ signal may be equal to the first signal period T1 again between times $t_4$ and $t_5$.

In some implementations, the clock frequency $f_0$ may be a non-integer multiple of the desired frequency $f_S$. For example, the clock frequency $f_0$ may be equal to 6.144 MHz and the desired frequency $f_S$ may be equal to 44.1 kHz. In such implementations, the first signal period T1 may be associated with a frequency higher than the desired frequency ($T1<1/f_S$) and the second signal period T2 may be associated with a frequency lower than the desired frequency ($T2>1/f_S$) so that the average frequency of the $WS_D$ signal between times $t_0$ to $t_4$ is equal to the desired frequency $f_S$. For example, if the duration from times $t_0$ to $t_4$ is equal to 1 second, the $WS_D$ signal may cycle through 44,100 periods between times $t_0$ and $t_4$.

Aspects of the present disclosure recognize that by varying the periodicity of the $WS_D$ signal, some periods of the $WS_D$ signal may span a greater number of clock cycles (of the SCK signal) than others. For example, the first signal period T1 spans fewer clock cycles than the second signal period T2. As a result, the duty cycle of the $WS_D$ signal is not equal to 50% when the periodicity of the $WS_D$ signal transitions between the first signal period T1 and the second signal period T2. In some implementations, the signal periods T1 and T2 may be configured so that each half-signal period spans at least the same number of clock cycles as a respective data word (such as associated with the left audio channel or the right audio channel).

Figure 5:
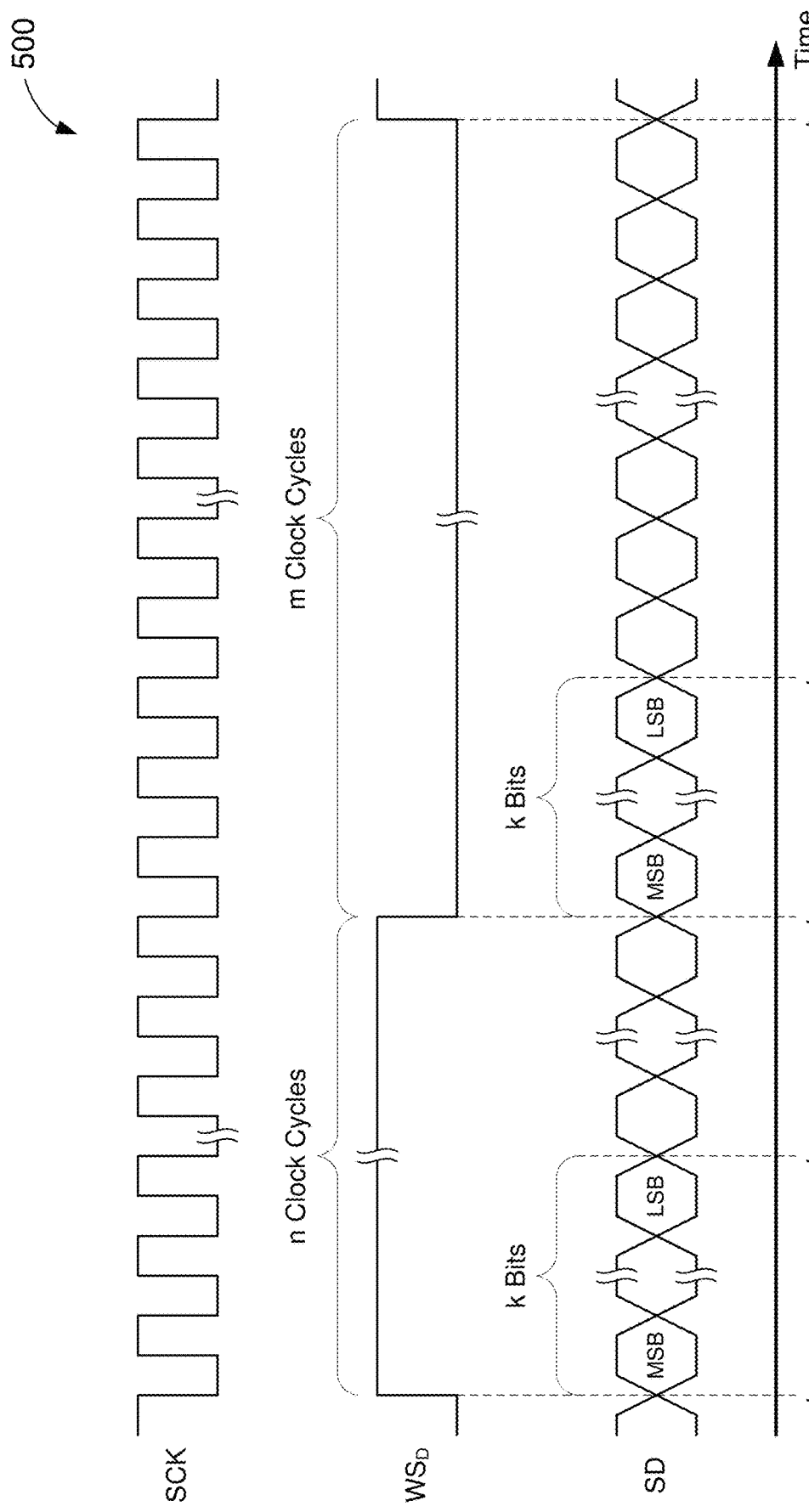
FIG. 5 shows another timing diagram depicting an example transmission of audio data associated with a dynamic word select signal.

FIG. 5 shows another timing diagram 500 depicting an example transmission of audio data associated with a dynamic word select ($WS_D$) signal. The $WS_D$ signal is output onto a serial data bus (such as an I2S serial bus) along with a serial clock (SCK) signal and a serial data (SD) signal between times $t_0$ and $t_4$. In some implementations, the SCK, $WS_D$, and SD signals may be examples of the SCK, $WS_D$, and SD signals, respectively of FIG. 4.

As shown in FIG. 4, the duty cycle of the $WS_D$ signal between times $t_0$ and $t_4$ is less than 50%. More specifically, the $WS_D$ signal is asserted to a high logic state for a number (n) of clock cycles (of the SCK signal) between times $t_0$ and $t_2$ and is asserted to a low logic state for a greater number (m) of clock cycles between times $t_2$ and $t_4$ (where m>n). In the example of FIG. 5, each data word is shown to include a number (k) of bits that is less than each of n and m. For example, between times $t_0$ and $t_1$, the SD signal carries a k-bit data word (beginning with the most significant bit (MSB) and terminating with the least significant bit (LSB)) associated with a right audio channel. Similarly, between times $t_2$ and $t_3$, the SD signal carries a k-bit data word (beginning with the MSB and terminating with the LSB) associated with a left audio channel.

Aspects of the present disclosure recognize that the unused bits following each k-bit data word (such as between times $t_1$ and $t_2$ and between times $t_3$ and $t_4$) are ignored or discarded by the receiver. Thus, in some aspects, the WS synthesizer may ensure that each half-signal period of the $WS_D$ signal spans a number of clock cycles that is greater than or equal to the number of bits in each data word (such as where n≥k and m≥k). For example, if each data word includes 24 valid bits (k=24), the $WS_D$ signal may maintain the left audio channel for 30 clock cycles (n=30) and the right audio channel for 35 clock cycles (m=35).

Figure 6:
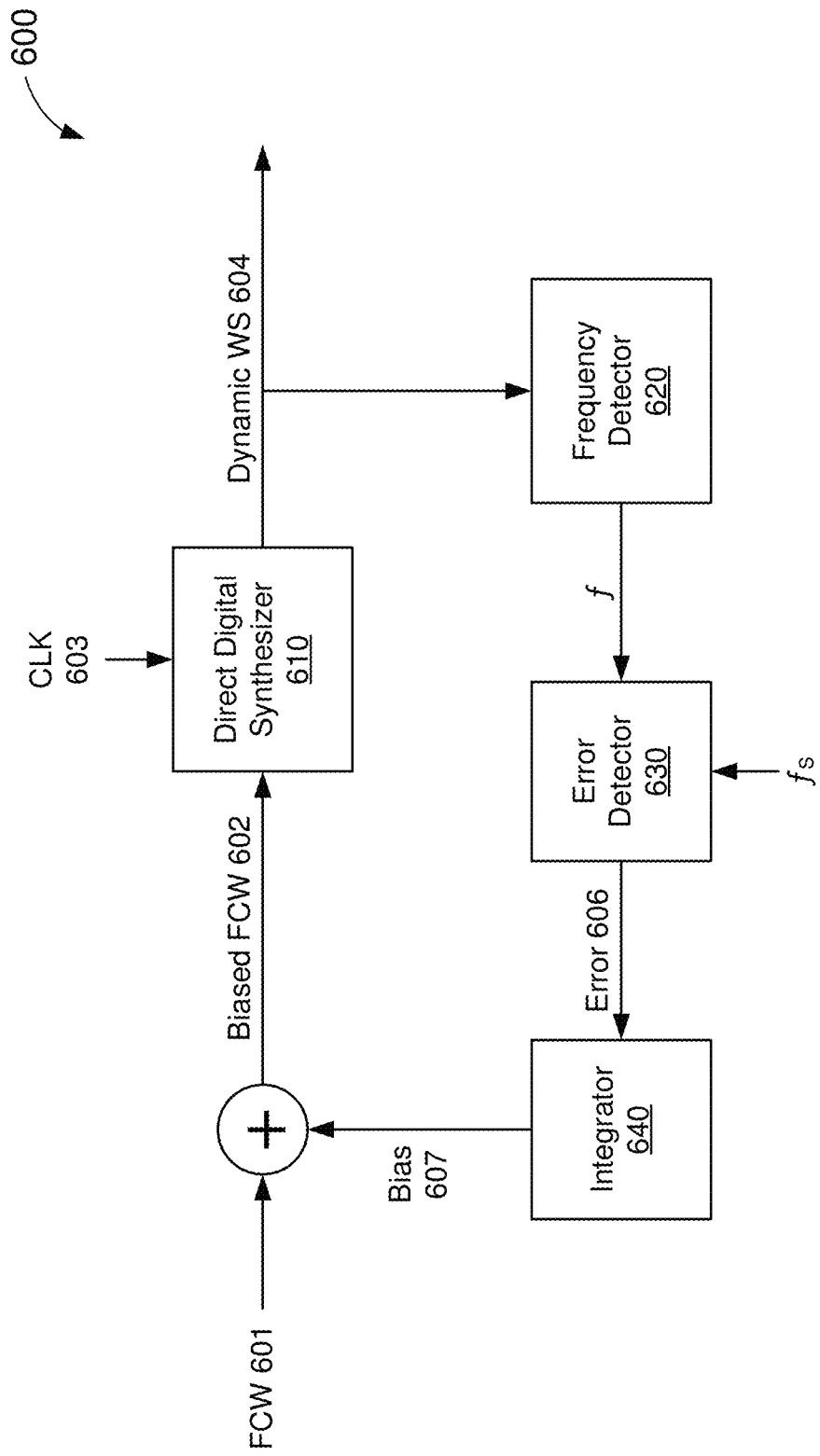
FIG. 6 shows a block diagram of an example word select synthesizer, according to some implementations.

FIG. 6 shows a block diagram of an example word select (WS) synthesizer 600, according to some implementations. In some aspects, the WS synthesizer 600 may be one example of the WS synthesizer 300 of FIG. 3. More specifically, the WS synthesizer 600 may be configured to generate a dynamic WS signal 604 based on an input clock (CLK) signal 603, having a frequency $f_0$, and a frequency control word (FCW) 601. The WS synthesizer 600 includes a direct digital synthesizer (DDS) 610, a frequency detector 620, an error detector 630, and an integrator 640.

In some implementations, a bias 607 may be applied (or added) to the FCW 601 to produce a biased FCW 602. The DDS performs direct digital synthesis on the CLK signal 603, using the biased FCW 602, to produce the dynamic WS signal 604. The biased FCW 602 has a digital value (M) that can be used to tune or control a frequency f of the dynamic WS signal 604 through direct digital synthesis, where $$M = 2^{20} * \frac{f}{f_0}.$$

In some aspects, the biased FCW 602 may be initially configured to have the same value as the FCW 601 (such as by setting the bias 607 equal to zero). Thus, the value of the FCW 601 represents an initial value of the biased FCW 602. In some implementations, the initial value of the biased FCW 602 may be set to cause the frequency f of the dynamic WS signal 604 to be substantially equal to a desired frequency $f_S$.

In some aspects, the value of the FCW 601 may be different than an ideal value ($M_0$) that would otherwise cause the frequency f of the dynamic WS signal 604 to be exactly equal to the desired frequency $f_S$. For example, to produce a desired frequency $f_S$=44.1 kHz based on a clock frequency $f_0$=6.144 MHz, the biased FCW 602 must have an ideal value $M_0$=7526.4. However, aspects of the present disclosure recognize that existing direct digital synthesis techniques are designed to operate on integer FCW values. Thus, in some implementations, the value of the FCW 601 may be equal to the nearest integer associated with the ideal value $M_0$ (such as [$M_0$] or [$M_0$]). For example, if the desired frequency $f_S$ is equal to 44.1 kHz and the clock frequency $f_0$ is equal to 6.144 MHz, the value of the FCW 601 may be set to 7526.

The frequency detector 620 measures the frequency f of the dynamic WS signal 604 and provides the measured frequency f to the error detector 630. The error detector 630 compares the measured frequency f to the desired frequency $f_S$ out outputs an error value 606 indicating a difference (or "error") between the measured frequency f and the desired frequency $f_S$. For example, if the desired frequency $f_S$ is equal to 44.1 kHz and the measured frequency f is determined to be 44097.65625 Hz, the error value 606 may be equal to 2.34375 Hz. The integrator 640 integrates or accumulates the error values 606 over time to produce the bias value 607. In other words, the bias value 607 represents the accumulated error, rather than the instantaneous error (as indicated by the error value 606), to produce a smoother or more gradual change to the biased FCW 602.

In some implementations, the operation of the frequency detector 620 may be combined with the operation of the error detector 630 to directly estimate the error value 606 from the dynamic WS signal 604. In such implementations, the combined frequency/error detection component may count a number (N) of clock cycles (of the CLK signal 603) over a number (M) of periods of the dynamic WS signal 604 and may output the difference between N and $M*f_0/f_S$ as the error value 606. For example, when the desired frequency $f_S$=44.1 kHz, the CLK signal 603 should ideally cycle through 6,144,000 periods for every 44,100 periods of the dynamic WS signal 604 (or over a 1 second duration). However, because the frequency f of the dynamic WS signal 604 cannot be tuned to exactly 44.1 kHz when the clock frequency $f_0$=6.144 MHz, the difference between the actual count value N and 6,144,000 indicates the error in the frequency f of the dynamic WS signal 604.

As shown in FIG. 6, the frequency detector 620, the error detector 630, and the integrator 630 form a feedback control loop that corrects for frequency errors in the dynamic WS signal 604 and prevents the frequency f of the dynamic WS signal 604 from diverging over time. For example, when the desired frequency $f_S$=44.1 kHz and the biased FCW 602 has a value equal to 7526, the error in the frequency f of the dynamic WS signal 604 is very small (2.34375 Hz). As such, the dynamic WS signal 604 can be used to transmit or receive frames audio data at an effective sample rate equal to 44.1 kHz over a short duration of time (such as a few seconds). If left uncorrected, the error may accumulate over time, causing the overall effective sample rate to be less than 44.1 kHz over extended periods of time. By dynamically changing the frequency f (and thus, the periodicity) of the dynamic WS signal 604, the WS synthesizer 600 may lock the effective sample rate of audio communications to the desired frequency $f_S$ over any duration of time.

Figure 7A:
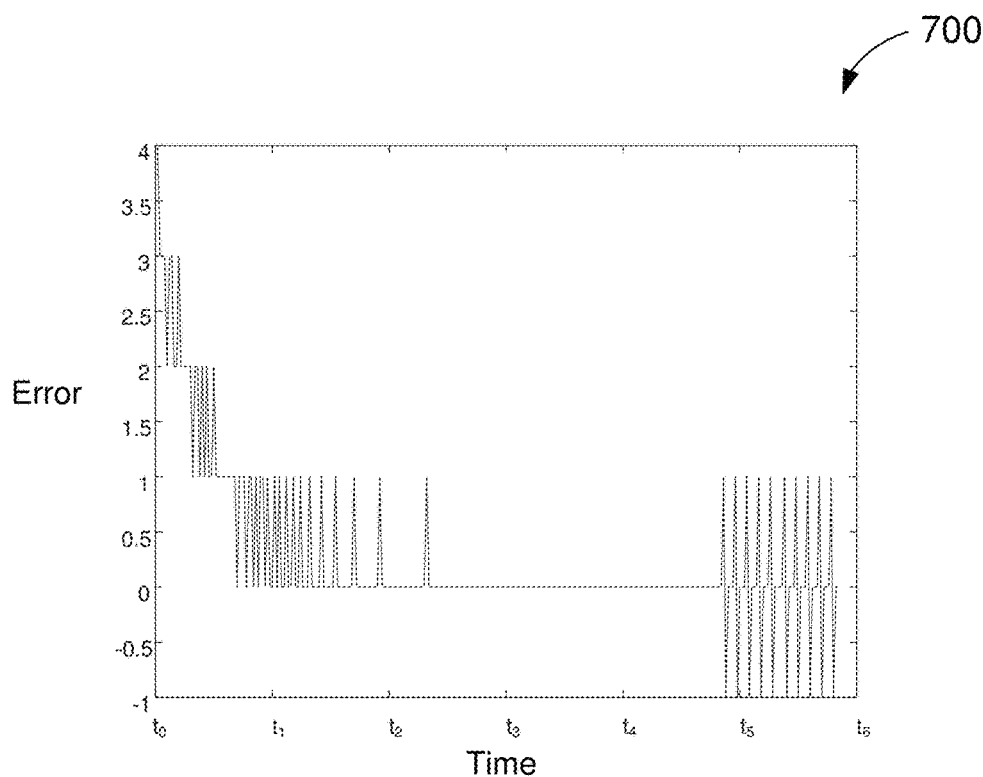
FIG. 7A shows a timing diagram depicting instantaneous errors in an example dynamic WS signal.

FIG. 7A shows a timing diagram 700 depicting instantaneous errors in an example dynamic WS signal. The errors shown in FIG. 7A may represent errors or differences between the frequency f of a dynamic WS signal, produced by a WS synthesizer, and a desired frequency $f_S$. In some implementations, the WS synthesizer may be one example of the WS synthesizer 600 of FIG. 6. Thus, the error depicted at each instance of time in FIG. 7A may be one example of the error value 606 of FIG. 6. In the example of FIG. 7A, the instantaneous error falls steadily to zero between times $t_0$ and $t_1$ and oscillates around 0.5 between times $t_1$ and $t_2$. The error spikes once (to +1), between times $t_2$ to $t_3$, but otherwise remains constant (at zero) until at least time $t_4$. The error then spikes (to +1) just before time $t_5$ and proceeds to oscillate around zero beyond time $t_5$.

Figure 7B:
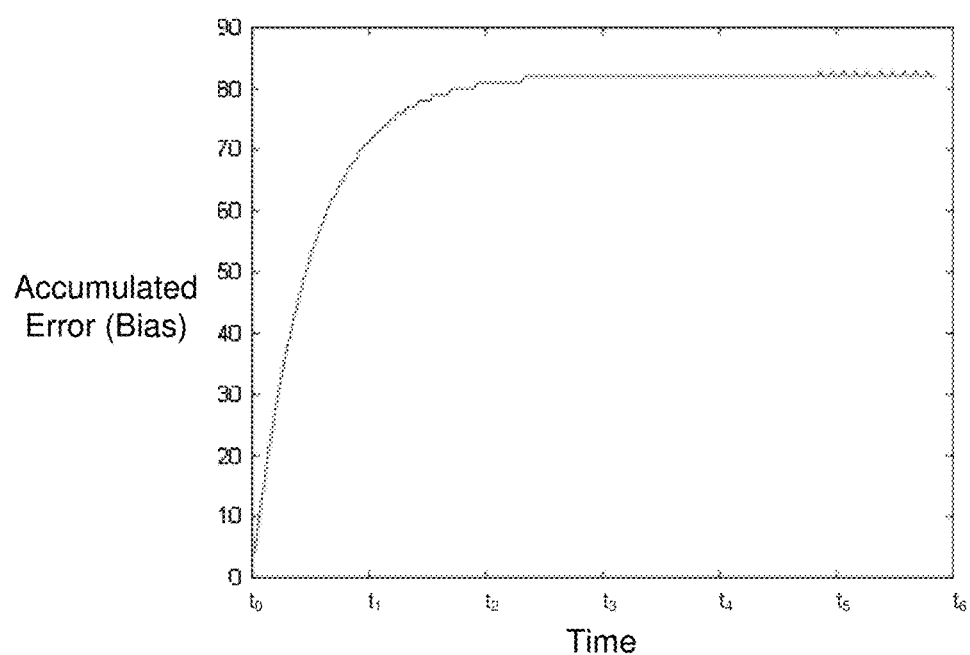
FIG. 7B shows a timing diagram depicting accumulated errors in an example dynamic WS signal.

FIG. 7B shows a timing diagram 710 depicting accumulated errors in an example dynamic WS signal. More specifically, the accumulated errors shown in FIG. 7B represent an accumulation of the errors shown in FIG. 7A from times $t_0$ to $t_5$. With reference for example to FIG. 6, the accumulated error depicted at each instance of time in FIG. 7B may be one example of the bias value 607. In the example of FIG. 7B, the accumulated error rises sharply between times $t_0$ and $t_1$ and tapers off or converges (to 80) between times $t_1$ and $t_2$. The accumulated error remains constant (at 80) from times $t_2$ to $t_4$ and fluctuates slightly (between 80 and 81) just before time $t_5$. Thereafter, the accumulated error continues to fluctuate (between 80 and 81) beyond time $t_5$. Compared to the instantaneous error depicted in FIG. 7A, the accumulated error changes much more gradually (and smoothly) over time.

With reference for example to FIG. 6, the WS synthesizer 600 may gradually tune the frequency f of the dynamic WS signal 604 to a desired frequency $f_S$ in response to the accumulated error (represented by the bias value 607) from times $t_0$ to $t_2$. However, the frequency f may begin to diverge from the desired frequency $f_S$ just before time $t_5$. The WS synthesizer 600 may detect this divergence based on the rise in accumulated error and may change the frequency or periodicity of the dynamic WS signal 604 in response thereto. As a result, the periodicity of the dynamic WS signal 604 may oscillate (such as between two periods) in response to the oscillations in the accumulated error beyond time $t_5$. This ensures that the effective frequency of the dynamic WS signal 604 remains locked to the desired frequency $f_S$.

Figure 8:
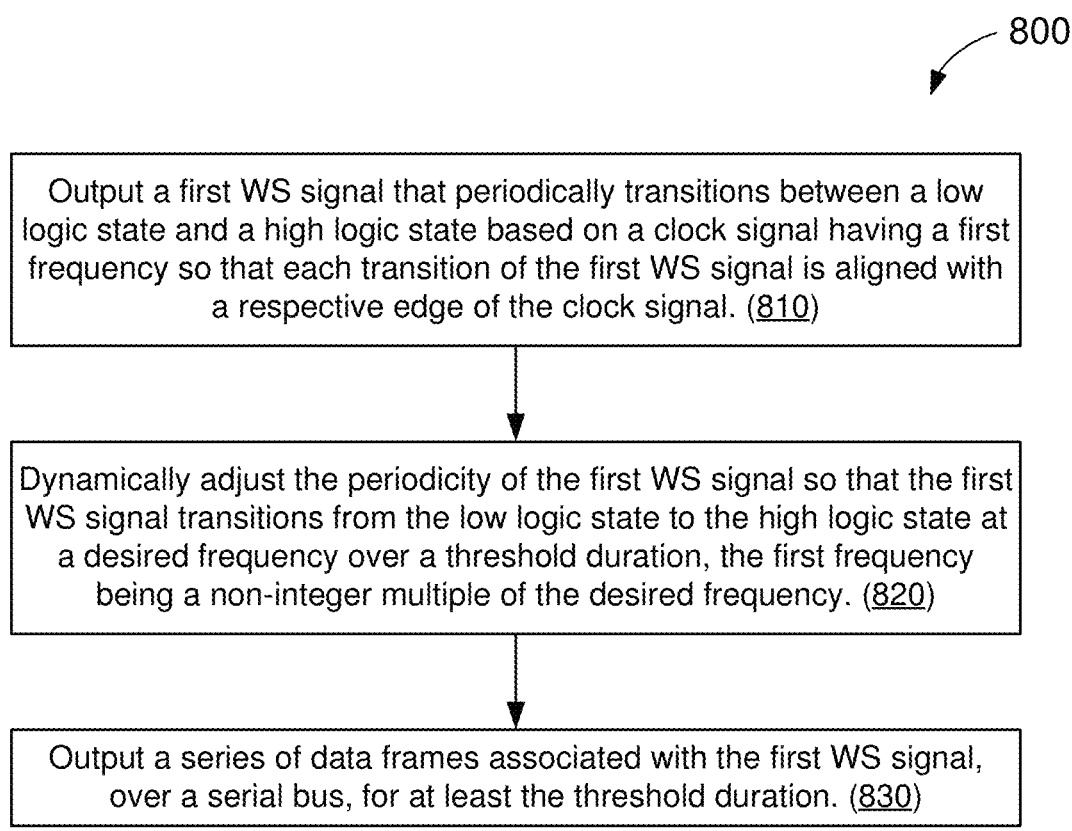
FIG. 8 shows an illustrative flowchart depicting an example operation for communicating audio data by a serial bus interface, according to some implementations.

FIG. 8 shows an illustrative flowchart depicting an example operation 800 for communicating audio data by a serial bus interface, according to some implementations. In some implementations, the example operation 800 may be performed by a serial bus interface (such as any of the serial bus interfaces 118 or 300 of FIGS. 1 and 3, respectively).

The serial bus interface outputs a first WS signal that periodically transitions between a low logic state and a high logic state based on a clock signal having a first frequency so that each transition of the first WS signal is aligned with a respective edge of the clock signal (810). The serial bus interface dynamically adjusts the periodicity of the first WS signal so that the first WS signal transitions from the low logic state to the high logic state at a desired frequency over a threshold duration, where the first frequency is a non-integer multiple of the desired frequency (820). The serial bus interface further outputs a series of data frames associated with the first WS signal, over a serial bus, for at least the threshold duration (830).

In some implementations, each of the data frames may include a first data word aligned with a transition of the first WS signal from the low logic state to the high logic state and a second data word aligned with a transition of the first WS signal from the high logic state to the low logic state. In some implementations, the first data word may be associated with a right audio channel and the second data word may be associated with a left audio channel.

In some implementations, the serial bus interface may generate the first WS signal based on direct digital synthesis (DDS) of the clock signal using a frequency control word. In some implementations, the dynamic adjusting of the periodicity of the first WS signal may include measuring a frequency of the first WS signal; determining an amount of error between the measured frequency and the desired frequency over a number (N) of cycles of the first WS signal; and biasing the frequency control word based at least in part on the amount of error between the first frequency and the desired frequency.

In some implementations, the determining of the amount of error may include counting a number (M) of cycles of the clock signal coinciding with the N cycles of the first WS signal; and comparing M to an expected number of clock cycles associated with the desired frequency. In some implementations, the biasing of the frequency control word may include integrating the amount of error determined for every N cycles of the first WS signal; and adding the integrated error to the frequency control word.

In some implementations, the desired frequency may be equal to 44.1 kHz and the first frequency is an integer multiple of 6.144 MHz. In some aspects, the serial bus interface may further output a second WS signal having a second frequency based on the clock signal, where the first frequency is an integer multiple of the second frequency; and receiving, over the threshold duration, a series of data frames associated with the second WS signal. In some implementations, the desired frequency is equal to 44.1 kHz and the third frequency is equal to 48 kHz.

Figure 9:
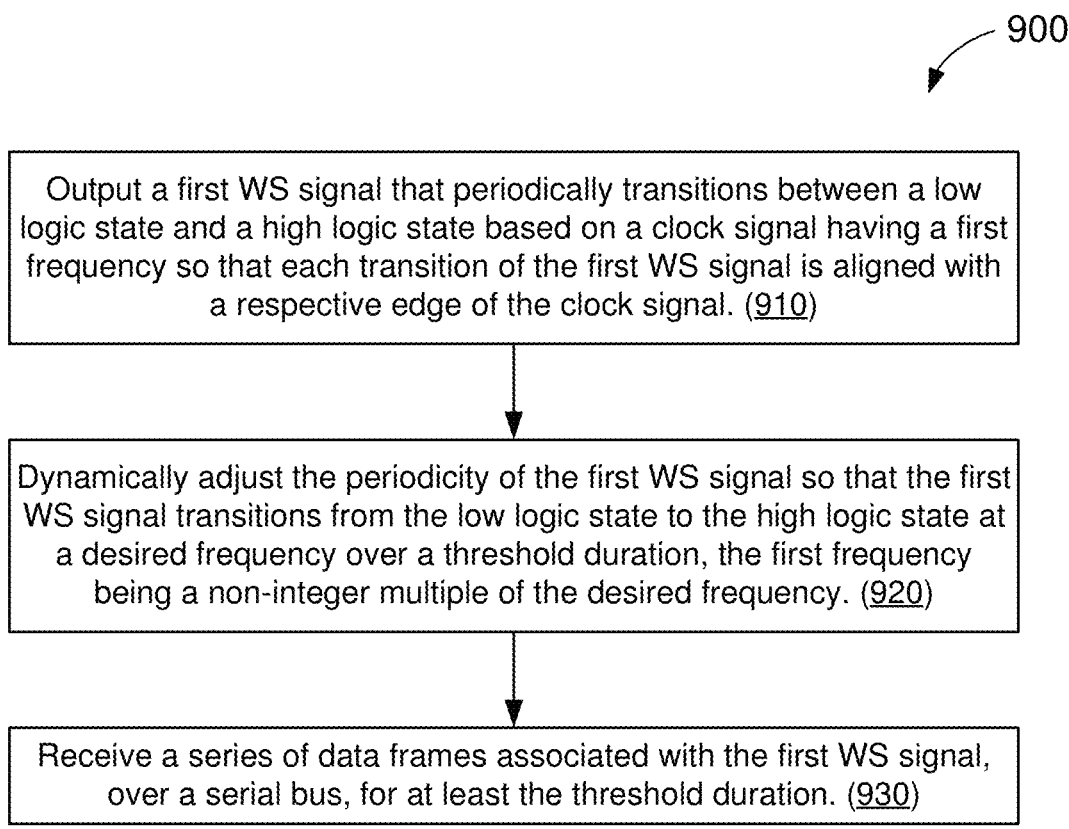
FIG. 9 shows another illustrative flowchart depicting an example operation for communicating audio data by a serial bus interface, according to some implementations.

FIG. 9 shows another illustrative flowchart depicting an example operation 900 for communicating audio data by a serial bus interface, according to some implementations. In some implementations, the example operation 900 may be performed by a serial bus interface (such as any of the serial bus interfaces 118 or 300 of FIGS. 1 and 3, respectively).

The serial bus interface outputs a first WS signal that periodically transitions between a low logic state and a high logic state based on a clock signal having a first frequency so that each transition of the first WS signal is aligned with a respective edge of the clock signal (910). The serial bus interface dynamically adjusts the periodicity of the first WS signal so that the first WS signal transitions from the low logic state to the high logic state at a desired frequency over a threshold duration, where the first frequency is a non-integer multiple of the desired frequency (920). The serial bus interface further receives a series of data frames associated with the first WS signal, over a serial bus, for at least the threshold duration (930).

In some aspects, the serial bus interface may further output a second WS signal having a second frequency based on the clock signal, where the first frequency is an integer multiple of the second frequency; and output, over the threshold duration, a series of data frames associated with the second WS signal.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

In the foregoing specification, embodiments have been described with reference to specific examples thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

What is claimed is:

1. A method of communicating audio data by a serial bus interface, comprising:

outputting a first word select (WS) signal based on direct digital synthesis (DDS) of a clock signal using a frequency control word, the first WS signal periodically transitioning between a low logic state and a high logic state based on the clock signal having a first frequency so that each transition of the first WS signal is aligned with a respective edge of the clock signal;

biasing the frequency control word so that the first WS signal transitions from the low logic state to the high logic state at a desired frequency over a threshold duration, the first frequency being a non-integer multiple of the desired frequency; and outputting a series of data frames associated with the first WS signal, over a serial bus, for at least the threshold duration.

2. The method of claim 1, wherein each of the data frames includes a first data word aligned with a transition of the first WS signal from the low logic state to the high logic state and a second data word aligned with a transition of the first WS signal from the high logic state to the low logic state.

3. The method of claim 2, wherein the first data word is associated with a right audio channel and the second data word is associated with a left audio channel.

4. The method of claim 1, wherein the biasing of the frequency control word comprises:

measuring a frequency of the first WS signal;

determining an amount of error between the measured frequency and the desired frequency over a number (N) of cycles of the first WS signal; and biasing the frequency control word based at least in part on the amount of error between the first frequency and the desired frequency.

5. The method of claim 1, wherein the biasing of the frequency control word comprises:

counting a number (M) of cycles of the clock signal coinciding with a number (N) of cycles of the first WS signal;

comparing M to an expected number of clock cycles associated with the desired frequency; and biasing the frequency control word based at least in part on the comparing.

6. The method of claim 1, wherein the biasing of the frequency control word comprises:

determining an amount of error between a frequency of the first WS signal and the desired frequency;

integrating the amount of error determined for every N cycles of the first WS signal; and adding the integrated error to the frequency control word.

7. The method of claim 1, wherein the desired frequency is equal to 44.1 kHz and the first frequency is an integer multiple of 6.144 MHz.

8. The method of claim 1, further comprising:

outputting a second WS signal having a second frequency based on the clock signal, the first frequency being an integer multiple of the second frequency; and receiving, over the threshold duration, a series of data frames associated with the second WS signal.

9. The method of claim 8, wherein the desired frequency is equal to 44.1 kHz and a third frequency is equal to 48 KHz.

10. A serial bus interface, comprising:

a word select (WS) synthesizer configured to output a first WS signal based on direct digital synthesis (DDS) of a clock signal using a frequency control word, the first WS signal periodically transitioning between a low logic state and a high logic state based on the clock signal having a first frequency so that each transition of the first WS signal is aligned with a respective edge of the clock signal;

frequency adjustment circuitry configured to bias the frequency control word so that the first WS signal transitions from the low logic state to the high logic state at a desired frequency over a threshold duration, the first frequency being a non-integer multiple of the desired frequency; and a first data buffer configured to output, over the threshold duration, a series of data frames associated with the first WS signal.

11. The serial bus interface of claim 10, wherein each of the data frames includes a first data word aligned with a transition of the first WS signal from the low logic state to the high logic state and a second data word aligned with a transition of the first WS signal from the high logic state to the low logic state.

12. The serial bus interface of claim 11, wherein the first data word is associated with a right audio channel and the second data word is associated with a left audio channel.

13. The serial bus interface of claim 10, wherein the frequency adjustment circuitry comprises:

frequency detection circuitry configured to measure a frequency of the first WS signal;

error detection circuitry configured to determine an amount of error between the measured frequency and the desired frequency over a number (N) of cycles of the first WS signal; and control word biasing circuitry configured to bias the frequency control word based at least in part on the amount of error between the first frequency and the desired frequency.

14. The serial bus interface of claim 10, further comprising:

a counter configured to count a number (M) of cycles of the clock signal coinciding with a number (N) of cycles of the first WS signal;

a comparator configured to compare M to an expected number of clock cycles associated with the desired frequency; and control word biasing circuitry configured to bias the frequency control word based at least in part on the comparison.

15. The serial bus interface of claim 10, further comprising:

error detection circuitry configured to determine an amount of error between a frequency of the first WS signal and the desired frequency;

an integrator configured to integrate the amount of error determined for every N cycles of the first WS signal; and an adder configured to add the integrated error to the frequency control word.

16. The serial bus interface of claim 10, further comprising:

a WS generator configured to output a second WS signal having a second frequency based on the clock signal, the first frequency being an integer multiple of the second frequency; and a second data buffer configured to receive, over the threshold duration, a series of data frames associated with the second WS signal.

17. A method of communicating audio data by a serial bus interface, comprising:

outputting a first word select (WS) signal based on direct digital synthesis (DDS) of a clock signal using a frequency control word, the first WS signal periodically transitioning between a low logic state and a high logic state based on the clock signal having a first frequency so that each transition of the first WS signal is aligned with a respective edge of the clock signal;

biasing the frequency control word so that the first WS signal transitions from the low logic state to the high logic state at a desired frequency over a threshold duration, the first frequency being a non-integer multiple of the desired frequency; and receiving a series of data frames associated with the first WS signal, over a serial bus, for at least the threshold duration.

18. The method of claim 17, further comprising:

outputting a second WS signal having a second frequency based on the clock signal, the first frequency being an integer multiple of the second frequency; and outputting, over the threshold duration, a series of data frames associated with the second WS signal.

* * * * *